(12) United States Patent  (10) Patent No.: US 8,931,744 B1
McLafferty  (45) Date of Patent: Jan. 13, 2015

(54) SHOPPING CART SUPPORT

(71) Applicant: Michael McLafferty, Rahway, NJ (US)

(72) Inventor: Michael McLafferty, Rahway, NJ (US)

( * ) Notice: Subject to any disclaimer, the term of this patent is extended or adjusted under 35 U.S.C. 154(b) by 0 days.

(21) Appl. No.: 13/768,090

(22) Filed: Feb. 15, 2013

(51) Int. Cl.
*B68G 5/00* (2006.01)
*A61G 5/12* (2006.01)

(52) U.S. Cl.
CPC ...................................... *A61G 5/12* (2013.01)
USPC ..................... 248/118; 248/118.5; 248/118.3; 248/278.1

(58) Field of Classification Search
USPC .............. 248/118, 118.5, 918, 297.11, 298.1, 248/278.1, 118.3, 291.11, 292.13, 292.14; 400/715; 340/711
See application file for complete search history.

(56) References Cited

U.S. PATENT DOCUMENTS

| | | | | |
|---|---|---|---|---|
| 2,864,189 A * | 12/1958 | Campbell | ....................... | 40/308 |
| 2,888,761 A * | 6/1959 | Miller | ............................. | 40/308 |
| 3,539,204 A * | 11/1970 | Keller | ............................. | 281/45 |
| 3,993,319 A * | 11/1976 | Day | ........................ | 280/33.992 |
| 4,156,318 A * | 5/1979 | Economy | ........................ | 40/308 |
| 4,443,961 A * | 4/1984 | Gilroy | ............................. | 40/308 |
| 4,496,058 A * | 1/1985 | Harris et al. | .................... | 40/308 |
| 4,583,753 A | 4/1986 | Economy | | |
| 4,685,701 A * | 8/1987 | Amundson et al. | ............. | 281/42 |
| 4,706,975 A | 11/1987 | Arena et al. | | |
| 4,805,937 A * | 2/1989 | Boucher et al. | .......... | 280/33.992 |
| 4,848,117 A * | 7/1989 | Welborn et al. | ................. | 40/308 |
| 4,858,353 A * | 8/1989 | Krebs et al. | ....................... | 40/308 |
| 4,913,393 A * | 4/1990 | Wood | ........................ | 248/230.2 |
| 5,004,196 A * | 4/1991 | Gross | ......................... | 248/118.3 |
| 5,004,252 A * | 4/1991 | Kraper | ...................... | 280/33.992 |
| 5,056,743 A * | 10/1991 | Zwar et al. | ..................... | 248/118 |
| 5,072,957 A * | 12/1991 | Graebe, Jr. | ............... | 280/33.992 |
| 5,086,960 A * | 2/1992 | Schwietzer | .................... | 224/277 |
| 5,108,057 A * | 4/1992 | Dandy et al. | ................... | 248/118 |
| 5,161,760 A * | 11/1992 | Terbrack | ....................... | 248/118 |
| 5,176,392 A | 1/1993 | Graebe, Jr. | | |
| 5,235,872 A * | 8/1993 | Giard, Jr. | ...................... | 74/551.8 |
| 5,280,932 A * | 1/1994 | Folsom | ..................... | 280/33.992 |
| 5,383,632 A * | 1/1995 | Shirlin et al. | ............... | 248/118.5 |
| 5,385,322 A * | 1/1995 | Kim et al. | ...................... | 248/118 |
| 5,398,896 A * | 3/1995 | Terbrack | ..................... | 248/118.5 |
| 5,425,546 A * | 6/1995 | Gerber et al. | ............. | 280/33.992 |
| 5,429,377 A * | 7/1995 | Duer | ......................... | 280/33.992 |
| 5,443,233 A * | 8/1995 | Kabanek | ....................... | 248/118 |
| D368,566 S | 4/1996 | Glaeser | | |
| 5,566,609 A * | 10/1996 | Kirschner | ........................ | 108/42 |
| 5,636,818 A * | 6/1997 | Edwards et al. | .............. | 248/214 |
| 5,845,884 A * | 12/1998 | Terbrack | ....................... | 248/118 |
| 6,076,791 A * | 6/2000 | Rand et al. | ................ | 248/229.24 |
| 6,158,640 A * | 12/2000 | Karp et al. | ..................... | 224/411 |
| 6,299,119 B1 * | 10/2001 | Dunning | ................. | 248/346.03 |
| 6,453,588 B1 * | 9/2002 | Lykens | ........................... | 40/308 |
| 6,454,224 B1 * | 9/2002 | Nogueira | ................... | 248/118.5 |
| 6,817,066 B1 * | 11/2004 | Williams et al. | ................ | 16/435 |
| 6,928,897 B2 * | 8/2005 | Duncan | ........................ | 74/551.8 |

(Continued)

*Primary Examiner* — Terrell McKinnon
*Assistant Examiner* — Monica Millner

(57) ABSTRACT

The present invention features a shopping cart support apparatus to a shopping cart with a cart handle and wheels for enhanced assistance for those slightly disabled or partially disabled persons. The support apparatus has a base support bar snugly and pivotably attached to the shopping cart handle. The support bar can be securely locked via at least one wing nut. Two sleeves are fixedly disposed on the support bar so that a user can rest his/her arms on for additional body support. A stopper component is disposed on the distal end of each sleeve to provide a secure means to hold the users arm in position.

1 Claim, 10 Drawing Sheets

(56) References Cited

U.S. PATENT DOCUMENTS

| | | |
|---|---|---|
| 6,936,022 B1 * | 8/2005 | Root .............................. 602/21 |
| 6,981,707 B1 * | 1/2006 | Dandy ..................... 280/33.992 |
| 7,219,822 B2 * | 5/2007 | Chretien et al. ............. 224/411 |
| 7,305,738 B2 * | 12/2007 | Nawrocki ....................... 16/428 |
| 7,568,707 B2 * | 8/2009 | Kolpien .................. 280/33.992 |
| D605,824 S * | 12/2009 | DiMento ....................... D34/27 |
| 7,673,410 B1 * | 3/2010 | Buerchner et al. .............. 40/658 |
| D616,669 S | 6/2010 | McMahon-Miller |
| 7,861,380 B2 * | 1/2011 | Moore et al. .................... 16/421 |
| 7,871,051 B2 * | 1/2011 | Schuermann et al. ......... 248/456 |
| 8,336,774 B2 * | 12/2012 | Crum ............................. 235/383 |
| 8,474,832 B2 * | 7/2013 | Mersky .................... 280/33.992 |
| 8,534,520 B1 * | 9/2013 | Liparoti ........................ 224/411 |
| 2002/0179782 A1 * | 12/2002 | Smeed ........................... 248/118 |
| 2004/0069918 A1 * | 4/2004 | McKinney ................. 248/274.1 |
| 2005/0212234 A1 | 9/2005 | McFarland |
| 2006/0186280 A1 * | 8/2006 | Thompson et al. ........... 248/118 |
| 2007/0273113 A1 | 11/2007 | Muir |
| 2008/0203249 A1 * | 8/2008 | Priest ............................ 248/118 |
| 2011/0057088 A1 * | 3/2011 | Hsu et al. ...................... 248/451 |

* cited by examiner

SHOPPING CART SUPPORT

FIELD OF THE INVENTION

The present invention relates to a shopping cart attachment, and more particularly to shopping cart attachments with adjustable sleeves to be used by people with certain disabilities.

BACKGROUND OF THE INVENTION

Shopping carts are widely used in various grocery or department stores. Most stores provide powered shopping carts for elderly, disabled or partially disabled persons. However, those power carts are expensive and very limited in numbers to meet customer needs. There are a large number of slightly disabled or partially disabled persons only need mild assistance for shopping. Hence, there is a need for a convenient and economic shopping cart accessory for stores to be adopted in a relatively large quantity to accommodate the needs for those slightly disabled or partially disabled persons.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a shopping cart support apparatus attached to a shopping cart with a cart handle and wheels for enhanced assistance for those slightly disabled or partially disabled persons. The support apparatus has a base support bar snugly and pivotably attached to the shopping cart handle. The support bar can be securely locked via at least one wing nut. Two sleeves are fixedly disposed on the support bar so that a user can rest his/her arms on for additional body support. A stopper component is disposed on the distal end of each sleeve to provide a secure means to hold the user's arm in position.

DESCRIPTION OF PREFERRED EMBODIMENTS

Figure 1:
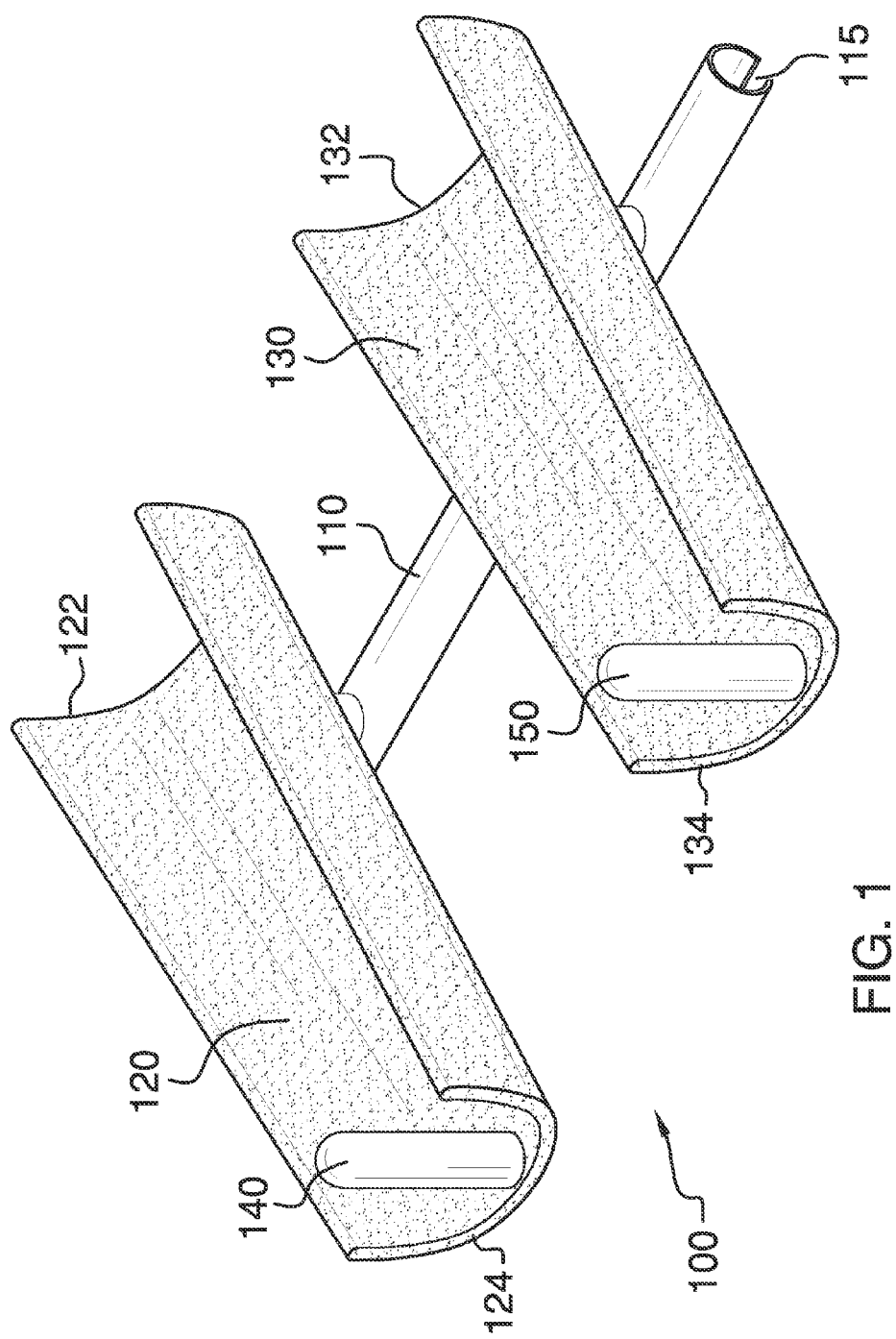
FIG. 1 shows an isometric view of the shopping cart support apparatus.
Figure 2:
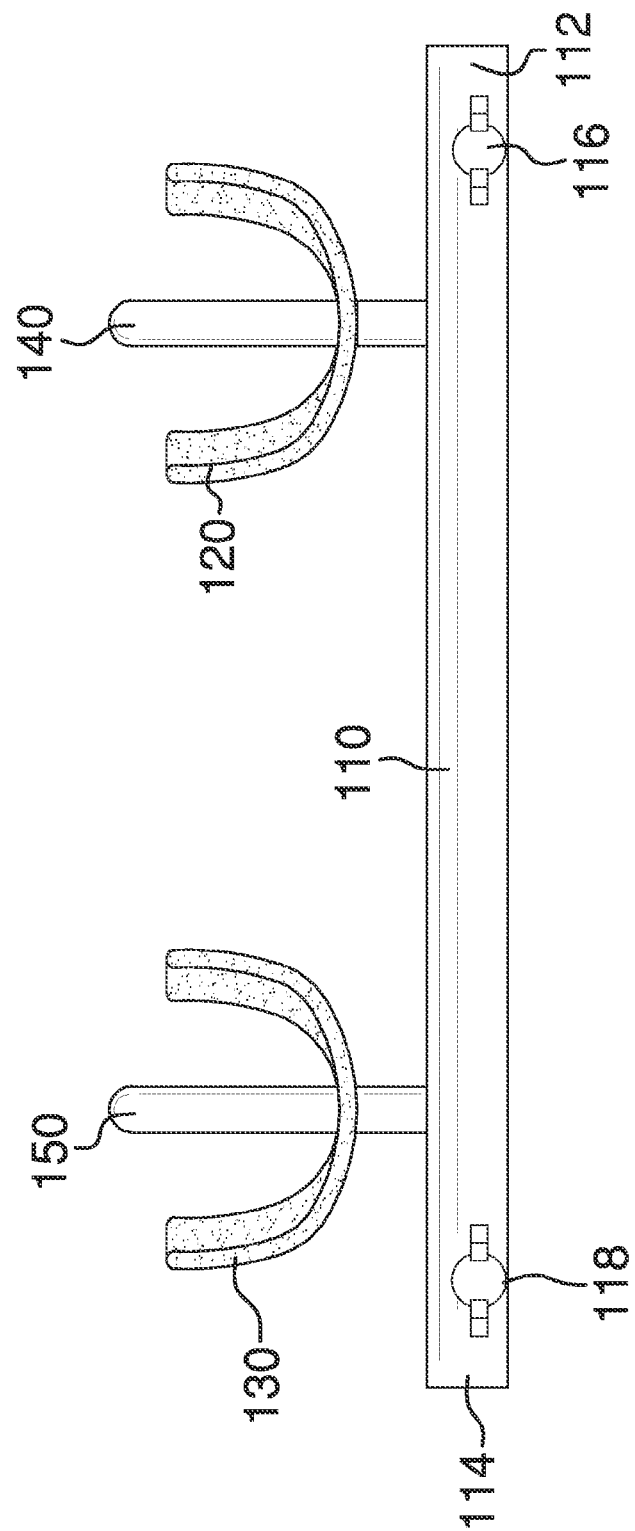
FIG. 2 shows a back view of the shopping cart support apparatus.
Figure 3:
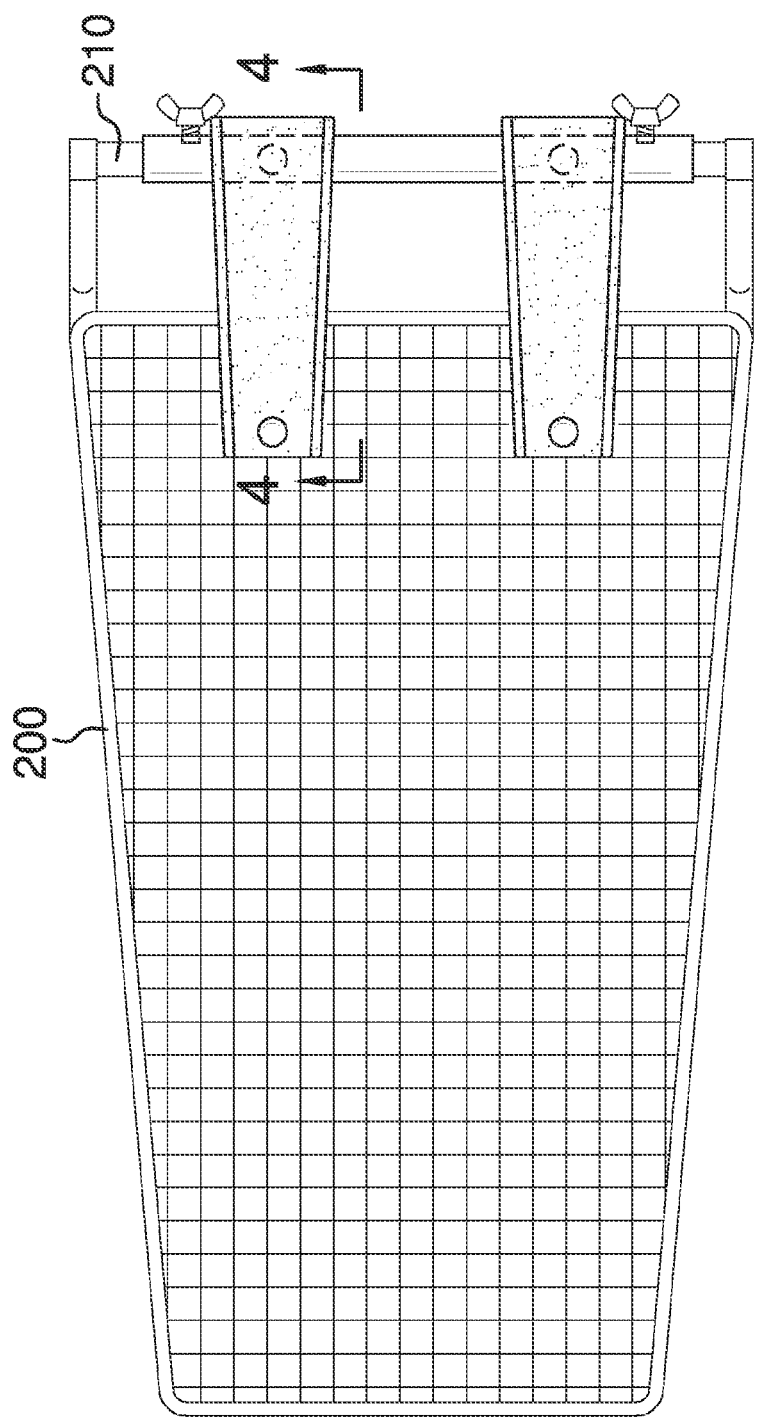
FIG. 3 shows a top view of the shopping cart support apparatus.
Figure 4:
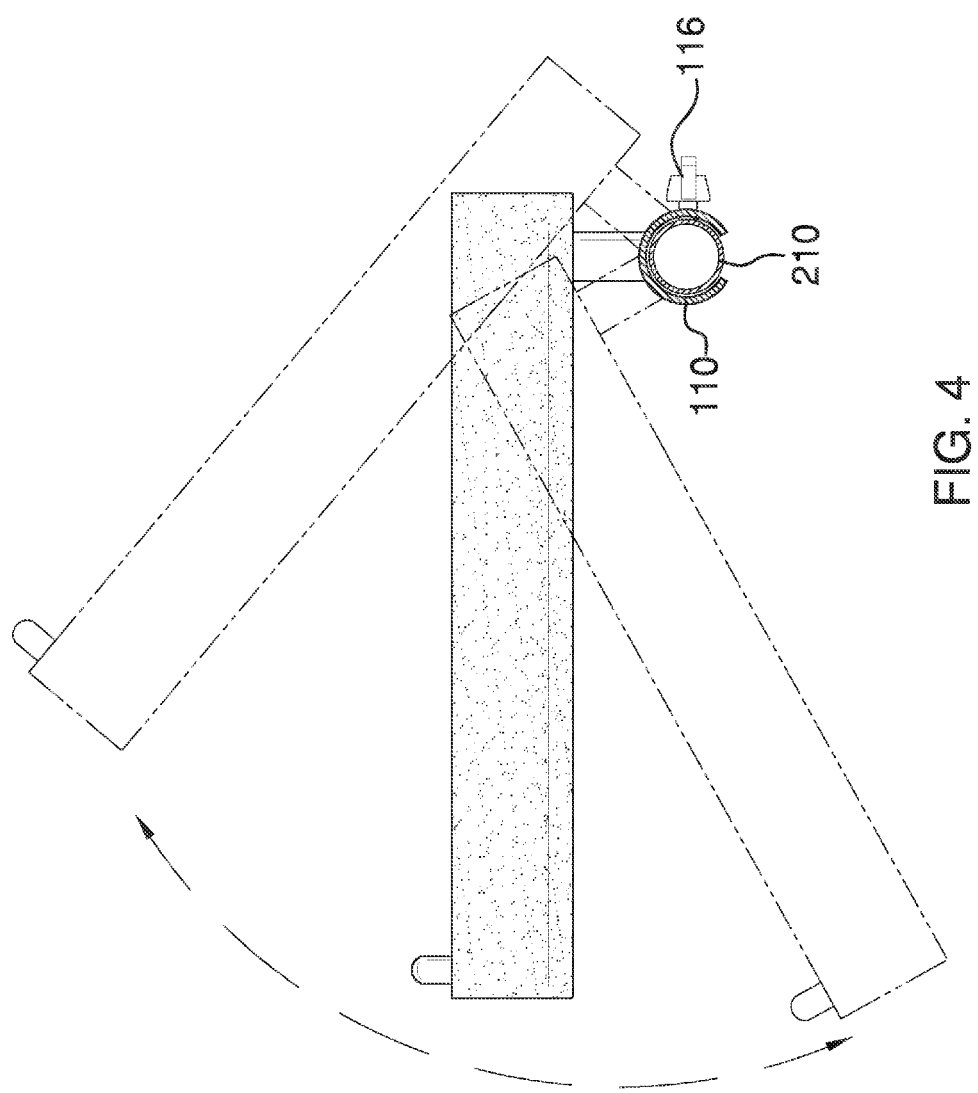
FIG. 4 shows a side view of the shopping cart support apparatus.

Referring now to FIGS. 1-10, the present invention features a shopping cart support apparatus (100) attached to a shopping cart (200) with a cart handle (210), wheels (220) and a shopping basket (230) for enhanced assistance for those slightly disabled or partially disabled persons.

The support apparatus (100) comprises a base support bar (110) snugly and pivotably attached to the shopping cart handle (210), wherein the support bar (110) has a first bar end (112) and a second bar end (114), wherein the base support bar (110) is lockable to the shopping cart handle (210) via a lock means. In some embodiments, the lock means is a screw means, wherein the base support bar (110) is locked to the shopping cart handle (210) via a first screw (116) disposed near the first bar end (112) of the base support bar (110) and a second screw (118) disposed near the second bar end (114) of the base support bar (110).

In some embodiments, the base support bar (110) is made of hard plastics. In some embodiments, the base support bar (110) has a slot (115) disposed along the length direction such that the base support bar (110) can be removed from the shopping cart handle (210) by slightly bent the slot for the purpose of cleaning, parts replacement, etc.

The support apparatus (100) comprises a first sleeve (120) and a second sleeve (130). The first sleeve is disposed on the base support bar (110) near the first bar end (112); wherein the first sleeve (120) has a first sleeve end (122) and a second sleeve end (124). The second sleeve (130) disposed on the base support bar (110) near the second bar end (114), wherein the second sleeve (130) has a first sleeve end (132) and a second sleeve end (134);

In some embodiments, a first stopper component (140) is disposed on the second sleeve end (124) of the first sleeve (120) and a second stopper component (150) is disposed on the second sleeve end (134) of the second sleeve (130).

The stopper components (140 and 150) are functioned to provide a secure means to hold the user's arm in position by preventing the arms sliding away from the sleeves.

Figure 5:
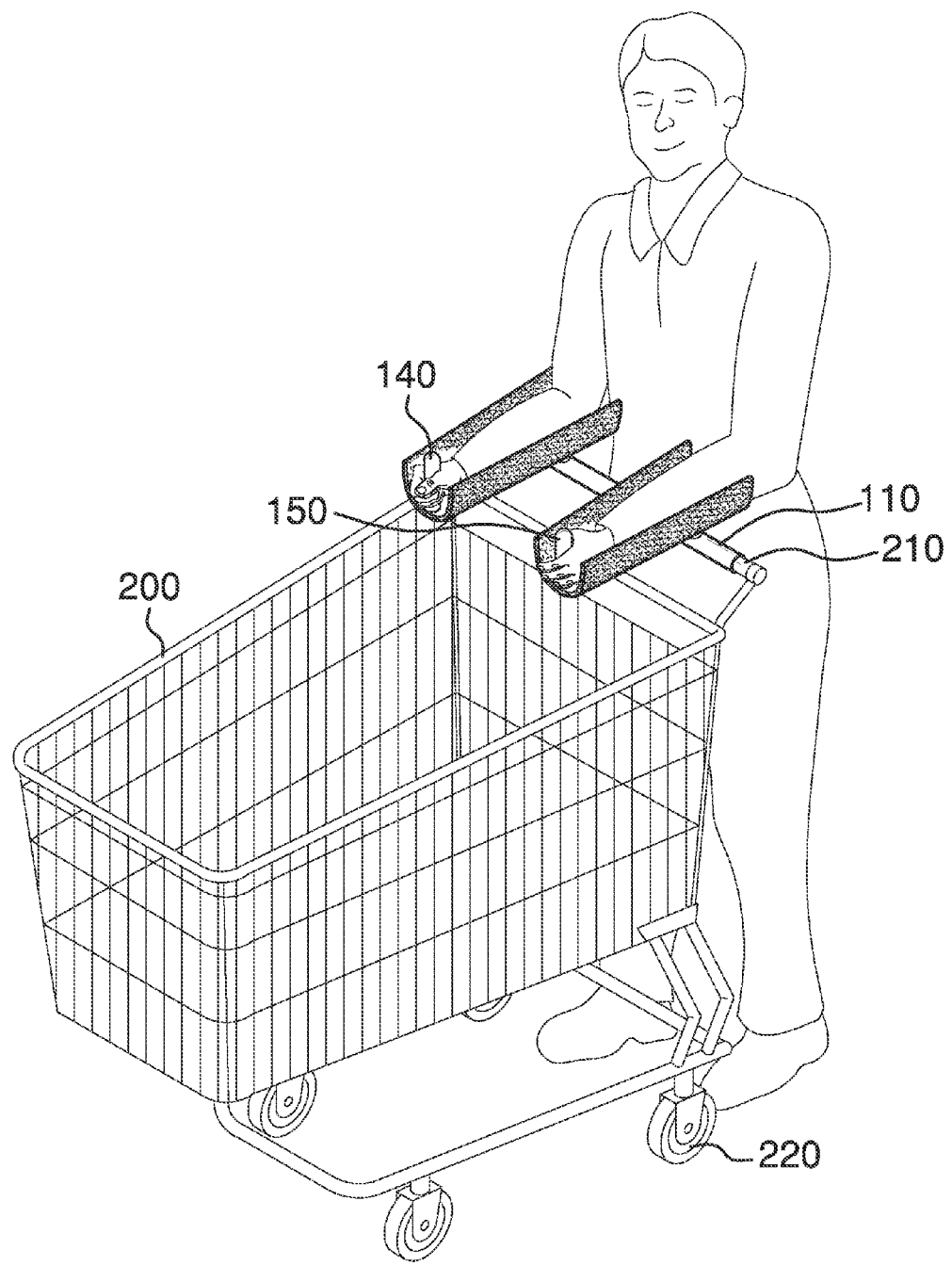
FIG. 5 shows an in-use view of the shopping cart support apparatus.
Figure 6:
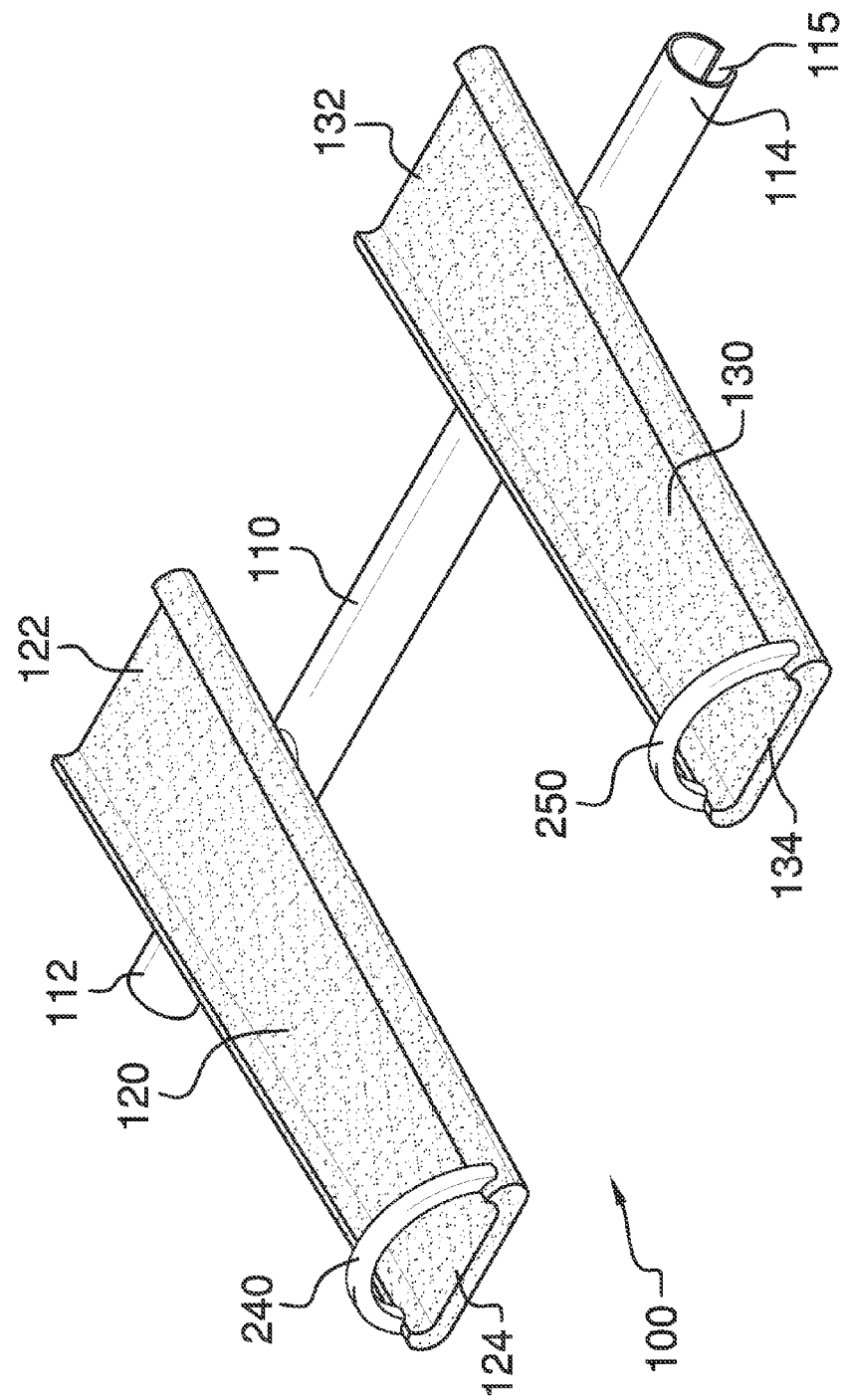
FIG. 6 shows an isometric view of an alternative shopping cart support apparatus.
Figure 7:
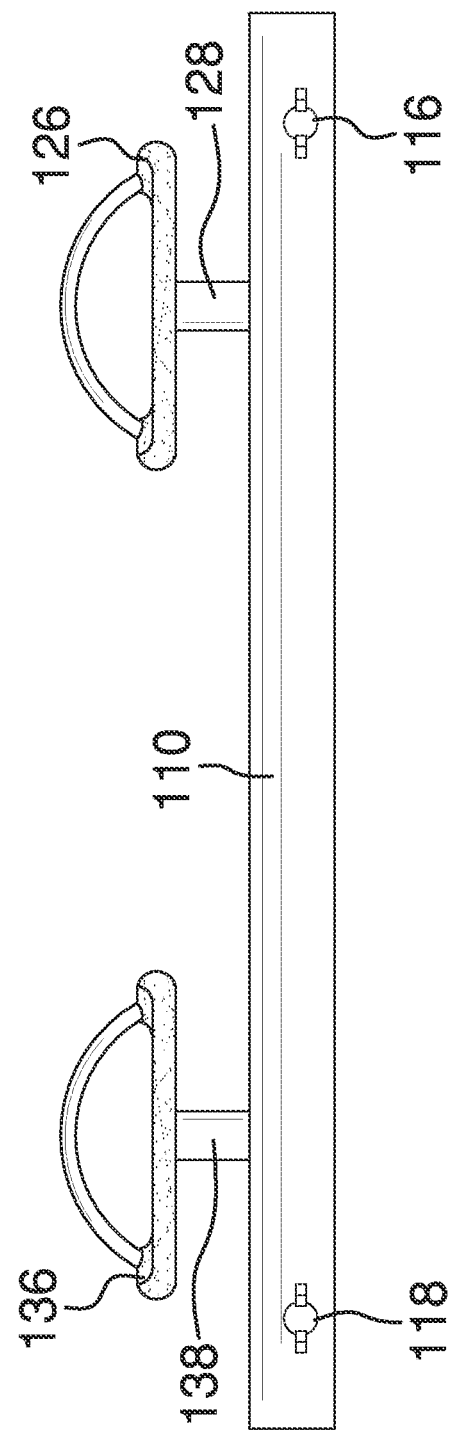
FIG. 7 shows a back view of the alternative shopping cart support apparatus.
Figure 8:
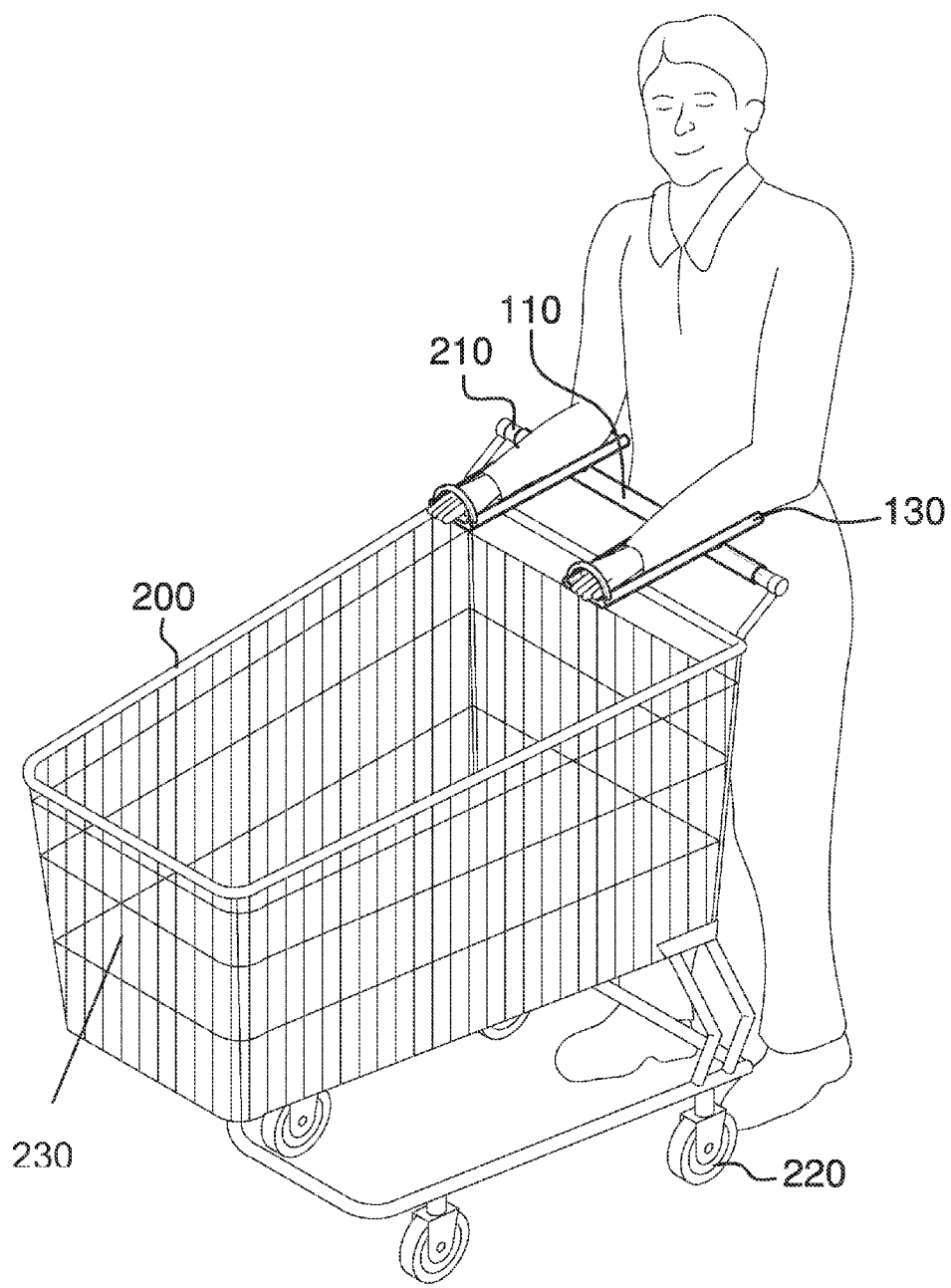
FIG. 8 shows an in-use view of the alternative shopping cart support apparatus.
Figure 9:
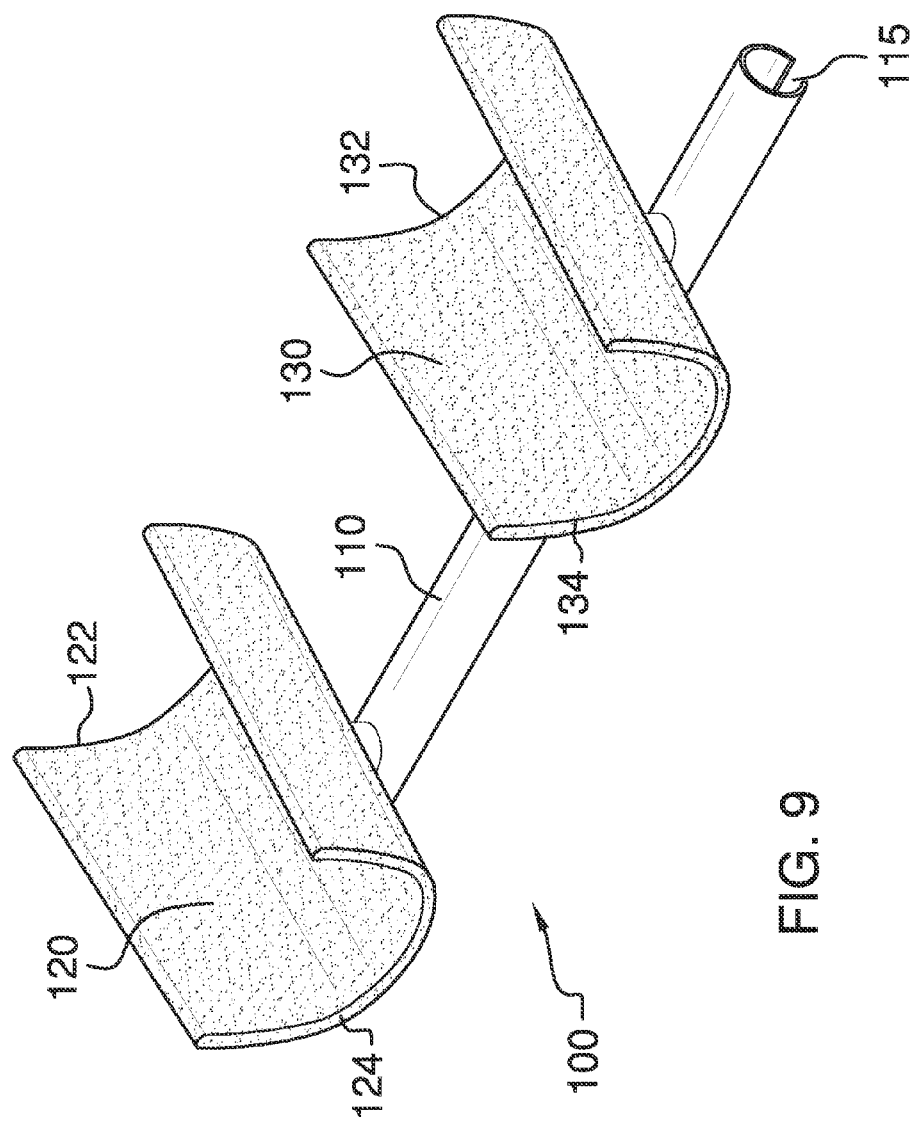
FIG. 9 shows an isometric view of an alternative shopping cart support apparatus.
Figure 10:
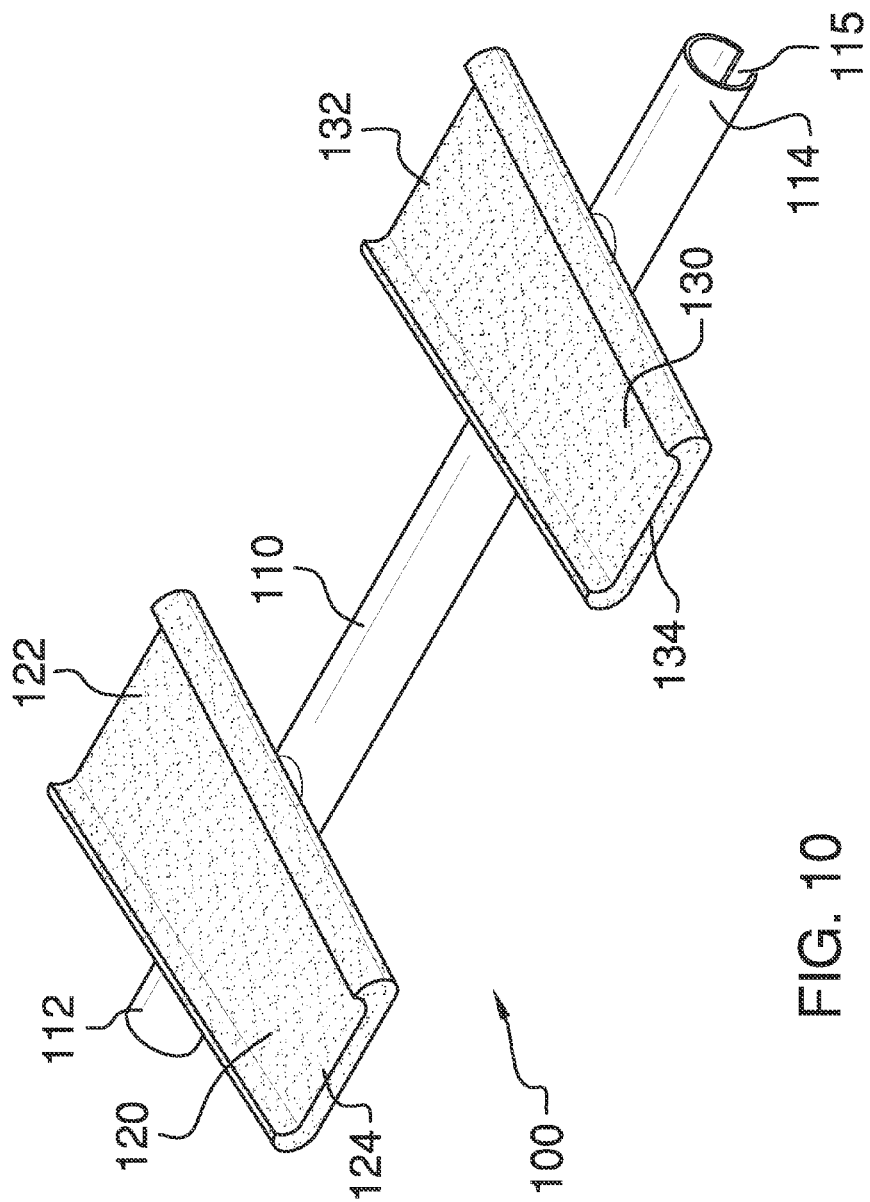
FIG. 10 shows an isometric view of another alternative shopping cart support apparatus.

In some embodiment, the stopper components (140 and 150) are column handles disposed on the center of the second sleeve end of the first and second sleeves, as shown in FIG. 1 and FIG. 5. The first handle (140) is disposed on the center of the second sleeve end of the first sleeve. The second handle (150) is disposed on the center of the second sleeve end of the second sleeve. In some embodiment, the stopper components (140 and 150) are arc shaped components (240 and 250), as shown in FIG. 6 and FIG. 8.

In some embodiments, the first sleeve (120) further comprises a first soft layer (126) disposed on the first sleeve (120). In some embodiments, the second sleeve (130) further comprises a second soft layer (136) disposed on the second sleeve (130).

In some embodiments, the soft layer (126, 136) is a foam coating to enhance comfort level when a user rests his/her arms on the sleeves. In some embodiments, the soft layer (126, 136) is water resistant such that the soft layer (126, 136) won't be soaked with water during shaped component raining days.

In some embodiments, the sleeves are flat. In some embodiments, the sleeves are concave to provide better and more comfortable arm support. In some embodiments, the sleeve has a top surface that is flat. In some embodiments, the sleeve has a top surface that is curved into a half-pipe structure. In some embodiments, the sleeve is a flat elongated structure. In some embodiments, the sleeve is an elongated half-pipe structure.

In some embodiments, the first sleeve (120) is disposed to the support bar (110) via a first column (128), wherein the first column (128) is securely attached to the support bar (110) near the first bar end (112) and the first sleeve (120) is attached to the first column (128). In some embodiments, the second sleeve (130) is disposed to the support bar (110) via a second column (138), wherein the second column (138) is securely attached to the support bar (110) near the second bar end (114) and the second sleeve (130) is attached to the second column (138). In some embodiments, the first column (128) and the second column (128) are height adjustable through a telescope means or a screw means to accommodate people with preference for different height.

In some embodiments, the sleeves have a length such that the sleeves do not protrude into the shopping basket (230). In some embodiments, the sleeves have a length smaller than 1 foot. In some embodiments, the sleeves have a length of 1 foot. In some embodiments, the sleeves have a length between 1 foot and 2 feet.

As used herein, the term "about" refers to plus or minus 10% of the referenced number. For example, a 2 feet length sleeve refers to a sleeve with a length between 1.8 feet and 2.2 feet.

The disclosures of the following U.S. Patents are incorporated in their entirety by reference herein: U.S. Patent Document: U.S. Pat. No. 6,848,751, U.S. Pat. No. 5,176,392, U.S. Pat. No. 4,706,975, U.S. Pat. No. 4,583,753, U.S. Pat. No. D368,556, U.S. Pat. No. D616,669, US patent application publication 2005/0212234, and US patent application publication 2007/0273113.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A shopping cart support apparatus (100) attached to a shopping cart (200) with a cart handle (210), wheels (220) and a shopping basket (230) for enhanced assistance for those slightly disabled or partially disabled persons, the shopping cart support apparatus (100) consisting of:
   (a) a base support bar (110) attached to the shopping cart handle (210), wherein the support bar (110) has a first bar end (112) and a second bar end (114), wherein the base support bar (110) is lockable to the shopping cart handle (210) via a lock means, wherein the lock means is a screw means, wherein the base support bar (110) is locked to the shopping cart handle (210) via a first screw (116) disposed directly on the first bar end (112) of the base support bar (110) and a second screw (118) disposed directly on the second bar end (114) of the base support bar (110);
   (b) a first sleeve (120) disposed on the base support bar (110) near the first bar end (112); wherein the first sleeve (120) has a first sleeve end (122) and a second sleeve end (124); and
   (c) a second sleeve (130) disposed on the base support bar (110) near the second bar end (114); wherein the second sleeve (130) has a first sleeve end (132) and a second sleeve end (134).

* * * * *